(12) United States Patent
Meisner et al.

(10) Patent No.: US 10,316,760 B2
(45) Date of Patent: Jun. 11, 2019

(54) TURBOSHAFT ENGINE CONTROL

(71) Applicant: UNITED TECHNOLOGIES CORPORATION, Farmington, CT (US)

(72) Inventors: Richard P. Meisner, Hartford, CT (US); Chaohong Cai, Hartford, CT (US); James W. Fuller, Hartford, CT (US); Timothy J. Crowley, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 466 days.

(21) Appl. No.: 14/626,163

(22) Filed: Feb. 19, 2015

(65) Prior Publication Data

US 2016/0069277 A1 Mar. 10, 2016

Related U.S. Application Data

(60) Provisional application No. 61/943,712, filed on Feb. 24, 2014.

(51) Int. Cl.
*F02C 9/52* (2006.01)
*F02C 9/54* (2006.01)
(Continued)

(52) U.S. Cl.
CPC .............. *F02C 9/52* (2013.01); *F02C 9/00* (2013.01); *F02C 9/28* (2013.01); *F02C 9/54* (2013.01);
(Continued)

(58) Field of Classification Search
CPC ...... F02C 9/00; F02C 9/48; F02C 9/54; F02C 9/26; F02C 9/28; F02C 9/18; F02C 9/20;
(Continued)

(56) References Cited

U.S. PATENT DOCUMENTS 2,861,638 A * 11/1958 Grosselfinger ......... B64C 27/30
60/39.281
4,807,129 A 2/1989 Perks
(Continued)

*Primary Examiner* — Phutthiwat Wongwian
*Assistant Examiner* — Loren C Edwards
(74) *Attorney, Agent, or Firm* — Cantor Colburn LLP

(57) ABSTRACT

A system and methods are provided for controlling turboshaft engines. In one embodiment, a method includes receiving input signals for a collective lever angle (CLA) command and real-time power turbine speed (NP) of an engine, determining system data for engine effectors by the control unit based on the input signals for the collective lever angle (CLA) command and the real-time power turbine speed (NP) based on an integrated model for the turboshaft engine including a model of a gas generator section of the turboshaft engine and a model of a power turbine and rotor load section of the turboshaft engine. The method may also include determining control output based on model-based multi-variable control including optimization formulation and a constrained optimization solver. The method may also include outputting one or more control signals for control of the turboshaft engine.

20 Claims, 5 Drawing Sheets

(51) Int. Cl.
*F02C 9/00* (2006.01)
*F02C 9/28* (2006.01)

(52) U.S. Cl.
CPC .... *F05D 2270/02* (2013.01); *F05D 2270/304* (2013.01)

(58) Field of Classification Search
CPC ........... F05D 2270/02; F05D 2270/304; F05D 2220/329
USPC .... 60/773, 793, 39.281, 39.282, 39.27, 794, 60/795
See application file for complete search history.

(56) References Cited

U.S. PATENT DOCUMENTS

| | | |
|---|---|---|
| 5,189,620 A * | 2/1993 | Parsons .................... G05B 7/02 318/609 |
| 6,873,887 B2 | 3/2005 | Zagranski et al. |
| 6,882,889 B2 | 4/2005 | Fuller et al. |
| 6,986,641 B1 | 1/2006 | Desai et al. |
| 8,594,904 B2 | 11/2013 | Livshiz et al. |
| 8,682,454 B2 | 3/2014 | Fuller et al. |
| 2011/0146232 A1* | 6/2011 | Westervelt ................ F02C 5/11 60/247 |
| 2015/0113996 A1 | 4/2015 | Cai et al. |
| 2018/0030904 A1 | 2/2018 | Meunier |

* cited by examiner

TURBOSHAFT ENGINE CONTROL

CROSS-REFERENCE TO RELATED APPLICATIONS

This application claims priority to U.S. Provisional Application No. 61/943,712 filed on Feb. 24, 2014 and titled Turboshaft Engine Control, the disclosure of which is hereby incorporated by reference in its entirety.

FIELD

The present disclosure relates generally to turboshaft engines, and more particularly to controlling turboshaft engine operation.

BACKGROUND

Turboshaft engines are used to power almost all modern helicopters and are often used to drive compression trains. By way of example, turboshaft engines also have many additional applications in transportation and utility. Turboshaft engines are also used for additional applications. There exists a need in the art to provide improved management of turboshaft engines, and in particular, control of power turbine speed with satisfactory power delivery.

BRIEF SUMMARY OF THE EMBODIMENTS

Disclosed and claimed herein are a turboshaft engine and methods of operating a turboshaft engine. In one embodiment, a method for controlling operation of a turboshaft engine includes receiving, by a control unit of the turboshaft engine, input signals for a collective lever angle (CLA) command and real-time power turbine speed (NP) of the engine, determining system data for engine effectors by the control unit based on the input signals for the collective lever angle (CLA) command and the real-time power turbine speed (NP), wherein the engine effectors includes one or more of fuel flow (WF), inlet guide vane control (IGV), and bleed schedule output (BLD), wherein the system data is determined by the control unit based at least in part on an integrated model for the turboshaft engine, the integrated model including a model of a gas generator section of the turboshaft engine and a model of a power turbine and rotor load, and determining control output for the engine effectors by the control unit based on the system data, wherein the control output is determined by the control unit based at least in part on model-based multi-variable control including optimization formulation and a constrained optimization solver. The method also includes outputting one or more control signals for control of the turboshaft engine by the control unit based on the control output for the engine effectors.

In another embodiment, a turboshaft engine system includes a gas generator, a power turbine and a control unit configured to control the gas generator and power turbine. The control unit is configured to receive input signals for a collective lever angle (CLA) command and a real-time power turbine speed (NP) of the engine. The control is also configured to receive input signals for a collective lever angle (CLA) command and a real-time power turbine speed (NP) of the engine, determine system data for engine effectors by the control unit based on the input signals for the collective lever angle (CLA) command and the real-time power turbine speed (NP), wherein the engine effectors includes one or more of fuel flow (WF), inlet guide vane control (IGV), and bleed schedule output (BLD), wherein the system data is determined by the control unit based at least in part on an integrated model for the turboshaft engine, the integrated model including a model of a gas generator section of the turboshaft engine and a model of a power turbine and rotor load, and determine control output for the engine effectors by the control unit based on the system data, wherein the control output is determined by the control unit based at least in part on model-based multi-variable control including optimization formulation and a constrained optimization solver. The control is also configured to output one or more control signals for control of the turboshaft engine by the control unit based on the control output for the engine effectors.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
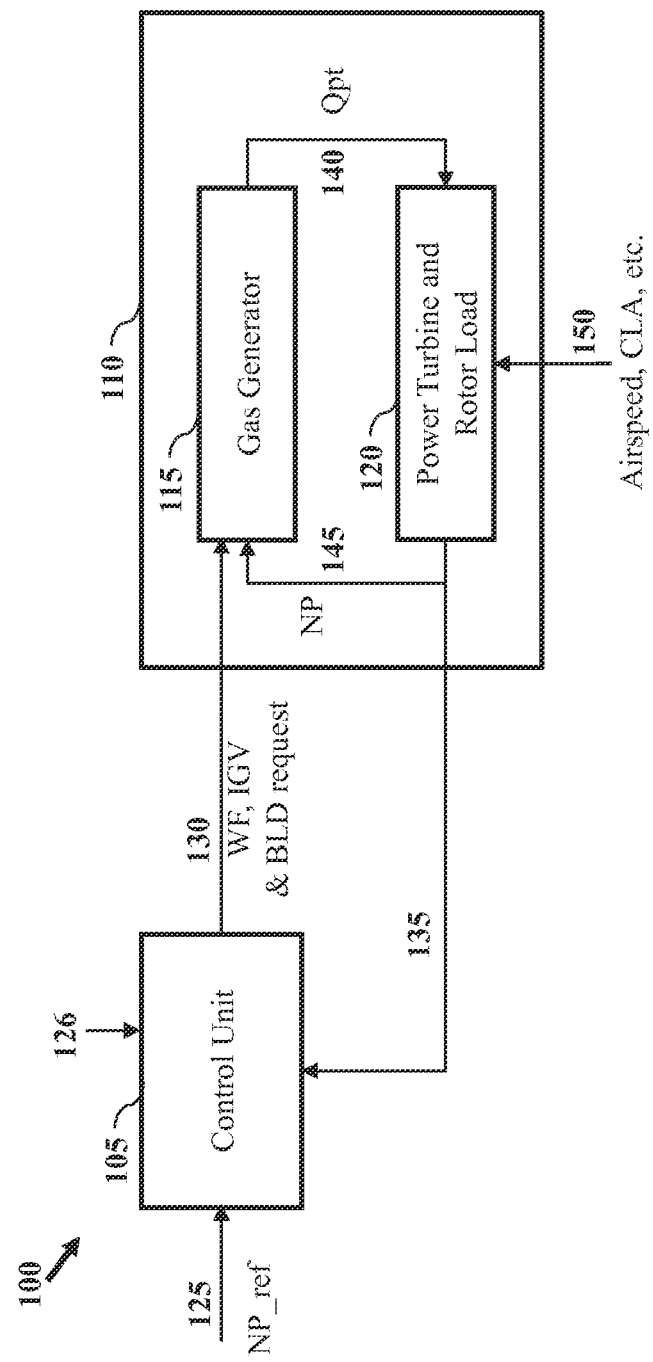
FIG. 1 depicts a simplified diagram of a turboshaft engine system according to one or more embodiments.

One aspect of the disclosure relates to a system and methods for turboshaft engine control. In one embodiment, turboshaft engine control may be based on a model-based control method to implement a variable feedback control using one or more of fuel flow (WF), inlet guide vane control (IGV), bleed schedule output (BLD) and variable compressor geometry. According to one embodiment, a method is provided for controlling operation of a turboshaft engine including determining control output for the turboshaft engine based on an integrated model and model-based multivariable control. Model-based multi-variable control can include optimization formulation of one or more engine effectors and a constrained optimization solver method to the optimization formulation. As used herein, engine effectors include one or more of fuel flow (WF), inlet guide vane control (IGV), and bleed schedule output (BLD) parameters. The integrated model includes modeling for a gas generator section and power turbine and rotor load section of the turboshaft engine. According to another embodiment, modeling of turboshaft engine sections may be individually parameterized.

Control may be provided for rotor speed management. In one embodiment, a process is configured to provide and maintain a constant, or near constant, rotor speed when delivering requested changes in power demand of a power turbine to achieve ideal handling qualities for an airframe. In another embodiment, engine control may be provided that matches changes in power demands while maintaining a constant rotor speed.

According to another embodiment, a turboshaft engine system is provided including a turboshaft engine and control unit configured to provide rotor speed management for the engine based on a model-based control method. The turboshaft engine and control unit may be employed for one or more of aircraft (e.g., helicopters, etc.), marine use, power generation and other applications.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a simplified diagram of a turboshaft engine system according to one or more embodiments. Turboshaft engine system 100, as shown in FIG. 1, includes control unit 105 and turboshaft engine 110 having gas generator section 115 and power turbine and rotor load section 120. According to one embodiment, control unit 105 may employ a model-based control method to implement a variable feedback control using one or more of fuel flow (WF), inlet guide vane control (IGV), bleed schedule output (BLD) and variable compressor geometry. As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

In embodiment, control unit 105 employs a model-based control method including an integrated model for gas generator section 115 and modeling for power turbine and rotor load section 120, and a model-based multi-variable control model including optimization formulation and a constrained optimization solver to determine control output.

According to one embodiment, control unit 105 may be configured to control operation of a turboshaft engine based on an integrated model including modeling for gas generator section 115 and modeling for power turbine and rotor load section 120. Control unit 105 may be configured to provide rotor speed management and may employ one or more processes for control. In one embodiment, control unit 105 may be configured to maintain a constant, or near constant, rotor speed maintained when delivering requested changes in power demand of a power turbine to achieve ideal handling qualities for an airframe. In another embodiment, control unit 105 may provide engine control that matches changes in power demands while maintaining a constant rotor speed.

According to one embodiment, turboshaft engine 110 is a gas turbine engine configured to produce shaft power or turbine power to a load (e.g., rotor load, etc.). As described herein, turboshaft engine 110 may include two major parts assemblies, gas generator section 115 and power turbine and rotor load section 120. Gas generator section 115 may include a compressor, combustion chambers with igniters and fuel nozzles, and one or more stages of turbine. Gas generator section 115 generates heat/gas to drive a power turbine(s) of turboshaft engine 110. Power turbine and rotor load section 120 may include one or more stages of turbines, a gear reduction system, shaft output, helicopter rotor system, etc.

According to one embodiment, control unit 105 is configured to control gas generator section 115, and power turbine and rotor load section 120. Control of gas generator section 115 and power turbine and rotor load section 120 may be based on a dynamic model, such as one or more of a model-based multi-variable control method and integrated model for the turboshaft engine. Control unit 105 may be configured to output one or more control signals based on data received from components of turboshaft engine. According to one embodiment, control of turboshaft engine 110 may be based on control reference signal 125 received by the control unit 105, which may include a desired turbine speed (NP_Ref) and/or a rotor speed control signal. According to another embodiment, control unit 105 may receive power turbine speed to determine parameters for control of engine 110. Control unit 105 may determine control output for turboshaft engine 110 based on one or more of a speed control signal, power turbine speed, and model-based multi-variable control method. In one embodiment, the model-based multi-variable control method is configured to optimize performance of the turboshaft engine 110 based on the engine characteristics, capabilities, operation, cycles, etc. The integrated model may be based on a model of a gas generator section and a power turbine section model of turboshaft engine 110. According to another embodiment, the integrated model may be based on one or more response models determined for turboshaft engine 110.

According to another embodiment, modeling of turboshaft engine sections by control unit 105 may be individually parametized. Control unit 105 may receive a control signal 125 to control operation of engine 100. Control signal 125 may indicate a desired turbine or shaft speed (NP_ref). According to one embodiment, control unit 105 may receive response model input 126 providing information and indications for determining operation of engine 110. Response model input 126 may provide one or more response parameters. Response model input 126 may be based on one or more parameters for controlling operation of the engine 110. Control unit 105 can provide control output 130 to engine 110 including activation control requests for one or more of fuel flow (WF), inlet guide vane control (IGV), and bleed schedule output (BLD). Control output 130 may control operation of gas generator section 115 and power turbine and rotor load section 120.

Gas generator 115 may provide gas generator output 140, such as a drive torque (Qpt), to power turbine 120. Power turbine 120 may be controlled based on gas generator output and one of more operational and flight parameters 150 (e.g., airspeeed, CLA, etc.). Operational and flight parameters 150 may be generated by control unit 105. In certain embodiments, control parameters 150 may be generated by a plurality of sensors operatively connected to control unit 105. The plurality of sensors may be disposed on a gas turbine engine, such as one or more of gas generator section 115 and power turbine and rotor load section 120, to generate signals indicative of operating parameters. Operating parameters may include, but are not limited to, a real-time power turbine speed (NP), a real-time power turbine torque and an estimated power turbine torque value. Power turbine 120 may also provide feedback signal 145 to gas generator 115 indicating turbine speed (NP). Engine 110 may provide feedback signal 135 to control unit 105.

According to one embodiment, control unit 105 may provide output signals based on a model determined for engine 110, such as an integrated model, and a model-based multi-variable control method. Control unit 105 may allow for one or more of reduced rotor speed excursion during fast load changes, better flight handling quality, more consistent compressor stall/surge protection, smoother transients between autorotation and recovery, better integration with airframe in load changes and more flexible support of multiple airframe applications.

Figure 2:
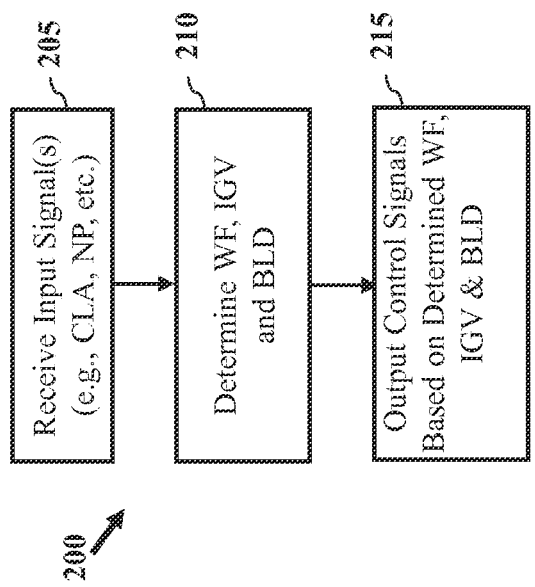
FIG. 2 depicts a process for controlling a turboshaft engine according to one or more embodiments.

FIG. 2 depicts a method for controlling an engine according to one or more embodiments. According to one embodiment, process 200 may be employed to control a turboshaft engine, and in particular, may be based on a model-based control method to implement multivariable feedback control of goals and limits using parameters for fuel flow (WF), inlet guide vane control (IGV), and bleed schedule output (BLD) and/or compressor variable geometry. According to another embodiment, process 200 may be performed by a control unit (e.g., control unit 105).

In certain embodiments, process 200 may allow for the rotor load of a turboshaft engine to run at a constant speed with a desired power. By controlling a gas generator section of a turboshaft engine, torque may be controlled to increase and/or change power. In certain embodiments, the power load speed may be held constant. In one embodiment, process 200 may provide constant speed by changing torque (e.g., Qpt).

Process 200 may be initiated at block 205 with receiving an input signal or signals, by the control unit, for a collective lever angle (CLA) command and a real-time power turbine speed (NP) of the engine. A control unit may receive a control signal (e.g., control signal 125) including one or more of a desired speed for a turboshaft engine, a CLA command, and turbine speed (NP). The control signal received at block 205 may be generated based on one or more operator controls for a turboshaft engine. The control unit can receive at least one response model parameter and power turbine speed. The power turbine speed may be provided to the control unit by a feedback loop from the power turbine.

At block 210, control output for fuel flow (WF), inlet guide vane control (IGV), bleed schedule output (BLD) may be determined by the control unit based on the input signals for the collective lever angle (CLA) command and the real-time power turbine speed (NP). In one embodiment, control output is determined at block 205 by the control unit based at least in part on an integrated model for the turboshaft engine, and model-based multi-variable control. As will be discussed in more detail below with respect to the integrated model including a model of a gas generator section of the turboshaft engine and a model of a power turbine and rotor load section of the turboshaft engine.

At block 215, one or more control signals may be output for control of the turboshaft engine by the control unit based on the control output for fuel flow (WF), inlet guide vane control (IGV), bleed schedule output (BLD)

Process 200 may be employed to the control output for one or more of helicopter propulsion, marine propulsion and electric power generation. Process 200 may allow for rotor speed management to provide desired helicopter performance and handling qualities, and the ability to tightly regulate rotor speed during aggressive collective pitch transients, as well as rotor load disturbances resulting from aggressive flight maneuvering such as high g turns or wave-off from a steep (auto-rotating) descent. As a result, system performance optimization can require simultaneous precise management of both the gas generator and rotor systems a turboshaft engine.

Process 200 may similarly be applied to other turboshaft applications such as electrical power generation, where rapid transient events such as drop load require precise management to keep the system on-line.

Figure 3:
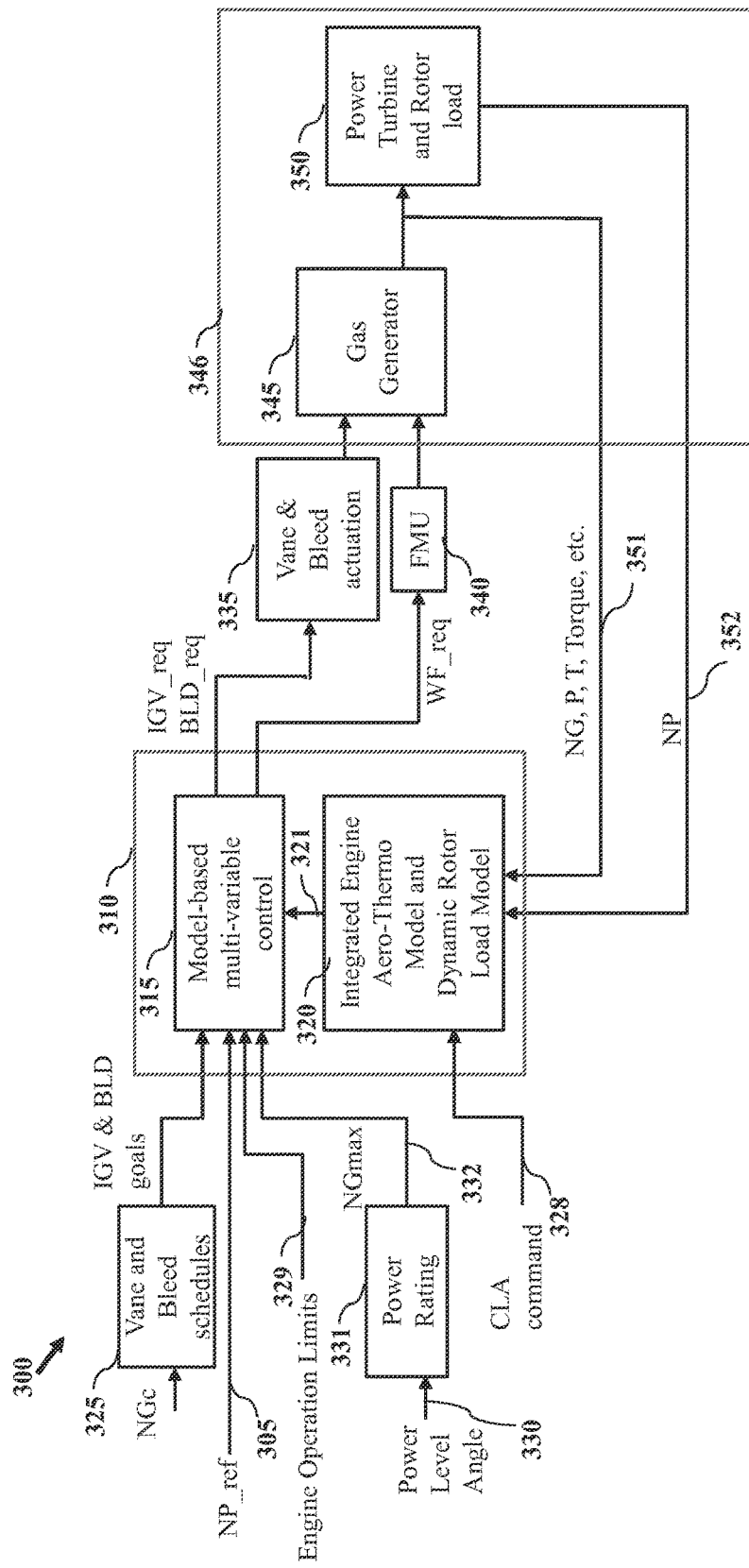
FIG. 3 depicts a model-based control method according to one or more embodiments.

FIG. 3 depicts a model-based control method according to one or more other embodiments. According to one embodiment, process 300 is a n-step model-based control method to provide multivariable feedback control using fuel flow and variable compressor geometry. Process 300 may provide multi-input and multi-output control using model-based control module 310. Model-based control module 310 may include one or more models/processes shown. As shown in FIG. 3, control module 310 includes model-based multi-variable control module 315 and engine aero-thermal model module 320 that may be an integration of gas generated aero-thermal model and power turbine and rotor load model. According to one embodiment, modules, such as modules 310, 315 and 320 in FIG. 3, are representations of a process or determinations by a control unit (e.g., control unit 105). According to one embodiment, model-based multi-variable control module 315 is shown as a separate module or process from integrated engine aero-thermal model module 320. It should be appreciated that in certain embodiments, model-based multi-variable control module 315 and integrated engine aero-thermal model module 320 are a single module. Alternatively, module 310 can include additional modules in some cases. Process 300 may be employed by a control unit (e.g., control unit 105) to control operation of a turboshaft engine.

According to one embodiment, control module 310 determines system data for fuel flow (WF), inlet guide vane control (IGV), and bleed schedule output (BLD) based at least in part integrated engine aero-thermal model module 320. As will be discussed in more detail below with reference to FIG. 4, integrated engine aero-thermal model module 320 includes a model of a gas generator section of the turboshaft engine and a model of a power turbine and rotor load section of the turboshaft engine. According to another embodiment, control module 310 determines control output for fuel flow (WF), inlet guide vane control (IGV), bleed schedule output (BLD) based on system data and at least in part on multi-variable control module 315. As will be discussed in more detail below with reference to FIG. 5, multi-variable control module 315 includes optimization formulation and a constrained optimization solver.

Model-based multi-variable control module 315 may receive one or more input parameters and output parameters for operation of a turboshaft engine. In one embodiment, model-based multi-variable control module 315 may receive control input 305 indicating a preferred power turbine speed. Control input 305 may include be a desired rotor speed for a turboshaft engine. Vane and bleed schedules module 325 may provide output of inlet guide vane (IGV) controls and bleed schedule (BLD) goals to model-based multi-variable control module 315. In one embodiment, integrated engine aero-thermal model module 320 is based on an integrated model, such as integrated model process 400 of FIG. 4. Model-based multi-variable module 315 may employ a model-based multi-variable control model, such as the process of FIG. 5, in certain embodiments.

According to one embodiment, control module 310 may receive one or more feedback signals to determine output parameters. By way of example, engine aero-thermal model module 320 may receive one or more signals from power turbine and rotor load module 350 indicating power turbine speed (NP) in real-time. In certain embodiments, power turbine and rotor load module 350 may output an estimated power turbine speed (NP_est) in real-time.

Model-based multi-variable control module 315 may generate output control signals based on received inputs and based on system data 321 output by integrated engine aero-thermal module 320. The output control signals may include vane control signals for vane activation unit 335 and fuel control signals for fuel metering unit (FMU) 340. Gas generator section 345 may receive output from vane activation unit 335 and FMU 340. Output of gas generator section 345 may be provided to power turbine and rotor load module 350. Gas generator section 345 and power turbine and rotor load module 350 may relate to the plant section, shown as 346, of a turboshaft engine.

In one embodiment, model-based multi-variable control module 315 may generate request signals for one or more of fuel flow signal (WF) indicative of the determined fuel flow, an inlet guide vane signal (IGV) indicative of the determined inlet guide vane schedules, and a stability bleed signal (BLD) indicative of the determined stability bleed schedules. FMU 340 may adjust fuel flow to gas generator section 345 according to the signals received from model-based multi-variable module 315. Vane activation unit 335 may adjust inlet guide vane signal (IGV) schedules, and a stability bleed signal (BLD) schedules for gas generator section 345 according to the signals received from model-based multi-variable module 315.

Figure 5:
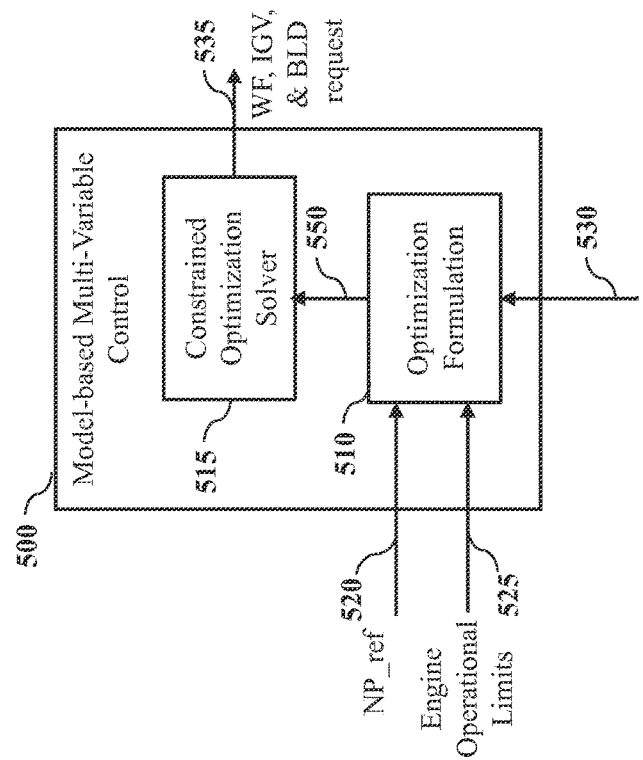
FIG. 5 depicts a graphical representation of model-based multivariable control module according to one or more other embodiments.

According to one embodiment, model-based multi-variable module 315 may employ an inversion of a dynamic model to generate the fuel flow (WF), inlet guide vane schedules (IGV), and stability bleed schedules (BLD). For example, as shown in FIG. 5, model-based multi-variable module 315 may include an optimization formulation module (e.g., optimization formulation module 510) and constrained optimization solver module (e.g., constrained optimization solver module 515).

Module 320 may be configured to integrate parameters of an engine aero-thermo model and dynamic rotor load model parameters. Integrated model 320 may generate output control signals, such as system data 321, to model-based multi-variable module 315 based on received inputs. According to one embodiment, module 320 may receive collective command input 328 indicating one or more operating commands for gas generator section 345. Engine output may be provided to engine aero-thermal model 320 by way of sensor measurements for gas generator feedback path 351. Power turbine and rotor load module 350 may be output to module 320 by way of feedback path 352 providing gas generator and power turbine parameters. Model 300 may be employed by a process, such as process 200 or process 600, or control unit to determine one or more control parameters for a turboshaft engine.

Vane and bleed schedules module 325 may provide output of inlet guide vane (IGV) controls and bleed (BLD) goals to model-based multi-variable module 315 based on a nonlinear static map from correct speed to open/close percentage of IGV and/or bleed controls. Model-based control module 310 and/or modules 315 and 320 may employ a process for controlling a gas turbine engine or be employed by a control system (or computer processor) for control of a turboshaft engine.

Model-based control module 310, and in particular module 320, may receive CLA command 328 which may include real-time collective lever angle command (CLA) input. The CLA command may provide pitch changes for rotor blades of a rotor load. Similarly, model-based control module 310 may receive a real-time power turbine speed (NP) signal via feedback path 352. Gas generator feedback path 351 may provide one or more feedback signals, such as gas generator speed (NG), gas path pressure (P), gas path temperature (T), power turbine torque, etc. Model-based multi-variable module 315 may be configured to generate fuel flow (WF), inlet guide vane (IGV), and stability bleed (BLD) signals based at least in part on system data 321 output by module 320. According to one embodiment, a gas turbine engine may be operated according to the generated fuel flow (WF), inlet guide vane (IGV), and stability bleed (BLD) signals such that the fuel flow, inlet guide vane, and stability bleed signals are provided to gas generator section 345 in order to control the torque output of the power turbine section.

According to another embodiment, model-based multi-variable module 315 may receive a desired power turbine speed (NP_ref) signal 305, one or more IGV and BLD goals generated by vane and bleed schedules module 325, engine operation limits 329, and parameters generated by power rating module 331.

In one embodiment, inlet guide vane (IGV) and bleed schedule (BLD) goals may be based on a corrected speed (NGc) for gas generator section 345. The correction of gas generator speed may be based on gas path temperature. Power rating module 331 receives a power lever angle signal (PLA) 330 to generate gas generator speed maximum limit (NG_max) signal. Gas generator speed maximum limit (NG_max) signal 332 may be sent to module 315 from power rating module 331. Since gas generator speed is a function of power lever angle, power rating module 331 may utilize tables to generate the gas generator speed maximum limit (NG_max) signal 332 based on the power lever angle (PLA) command.

Model-based multi-variable module 315 may receive engine operation limit parameters 329 relating to limits for one or more of intake, pressure, temperature, etc. According to another embodiment, power level angle parameters 330 received by power rating module 331 may be used to output the maximum turbine parameters, such as gas generator speed maximum limit (NGmax) 332 to model-based multi-variable module 315. Engine operation limit parameters 329 may be one or more engine specific limits for parameters of gas generator feedback path 351. Power level angle parameters 330 may be one or more power ratings for mapping PLA 330 to gas generator maximum.

Based at least in part on the received signals, model-based control module 310 and/or modules 315 and 320 may determine a control signal for the power turbine that will match the estimated power turbine speed (NP_est) in real-time to the desired power turbine speed (NP_ref) 305. In so doing, model-based control module 310 and/or modules 315 and 320 may maintain the power turbine at a same rotor speed, or power turbine speed.

In one embodiment, if the model-based multi-variable module 315 is not accurate, a control module 310 (e.g., control unit 105, etc.) may employ a classical estimation model to improve model accuracy. Module 320 may rely on an estimation technique to increase fidelity. By way of example, an estimation module may generate the estimated states of an integrated engine aero-thermal module 320 by combining dynamic model prediction with real-time sensor measurements as feedback correction. In certain embodiments, the estimation technique may utilize a classical Kalman Filter design approach or other unbiased estimation approaches.

Figure 4:
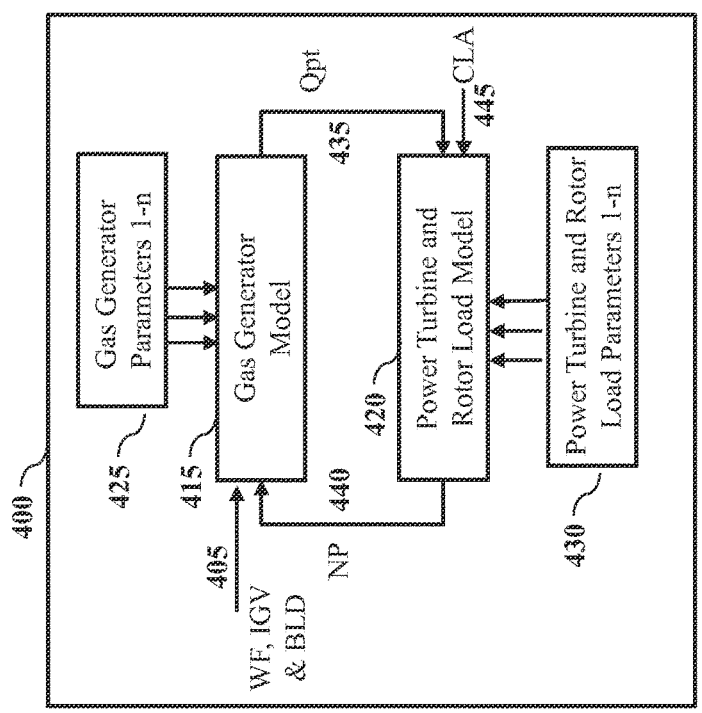
FIG. 4 depicts a graphical representation of an integrated model process according to one or more embodiments.

Referring now to FIG. 4, a graphical representation of an integrated model process is depicted according to one or more embodiments. According to one embodiment, integrated model process 400 is a numerical mathematical modeling process for turboshaft engine operation, such as an integrated engine aero-thermo and dynamic rotor load model 320 of FIG. 3. Integrated model process 400 may be executed by a control unit, such as a processor, to allow for use in real-time form with control of a turboshaft engine (e.g., engine 110). By way of example, control unit 105 may utilize a process, based at least in part on integrated model process 400, for control of a turboshaft engine.

According to one embodiment, integrated model process 400 may be based on receiving inputs 405 and 445 representative of a desired control signal for a turboshaft engine. Input 405 may include parameters for one or more of fuel flow (WF), inlet guide vane control (IGV), and bleed schedule output (BLD). Input 445 may include parameters for one or more of collective lever angle command (CLA). According to one embodiment, integrated model process 400 is a non-linear or parameter-varying linear model composed in real time from gas generator non-linear or parameter-varying linear model and a power turbine and rotor load non-linear or parameter-varying linear model. Integrated model 400 may be augmented by effector response model(s). Integrated model 400 may be based on an n-step model-based control method to implement multivariable feedback control of goals and limits using fuel flow and compressor variable geometry based on the plant model.

Integrated model process 400 includes a gas generator model 415 to model operation of a gas generator (e.g., gas generator section 115) and a power turbine and rotor load model 420 to model operation of a power turbine and rotor load (e.g., power turbine and rotor load section 120). According to one embodiment, gas generator model 415 may be in a feedback loop with power turbine and rotor load model 420, such that output 435 represents a power turbine output torque and output 440 represents power turbine speed. Gas generator model 415 may receive one or more gas generator parameters 425. According to one embodiment, gas generator model 415 is parameterized as a function of corrected rotor speeds and/or flight condition. According to another embodiment, gas generator linear model 415 is calculated in real-time from an embedded nonlinear or parameter-varying gas generator model.

Power turbine and rotor load (PTRL) model 420 may represent a model of a power turbine and rotor load section of an engine. According to one embodiment, PTRL model 420 may be a linear model that is independently parameterized. As shown in FIG. 4, PTRL model 420 may receive one or more power turbine and rotor load parameters 430 based on a particular turboshaft engine. According to another embodiment, PTRL 420 may be calculated in real time from an embedded non-linear or parameter-varying PTRL model. Integrated model process 400 may be used by a control unit to generate one or more response model parameters including but not limited to parameters for fuel flow (WF), inlet guide vane control (IGV), and bleed schedule output (BLD).

FIG. 5 depicts a graphical representation of model-based multivariable control according to one or more other embodiments. According to one embodiment, module 500 may be a model-based multi-variable control module (e.g., model-based multi-variable control module 315). As shown in FIG. 5, module 500 includes optimization formulation module 510, and constrained optimization solver module 515. Module 500 may be configured to generate output control signals based on one or more received inputs.

According to one embodiment, optimization formulation module 510 may be configured to receive control input 520 (e.g., control input 305) indicating a preferred speed (Npref), engine operational limits 525 (e.g., engine operational limits 329) and output 530 (e.g., system data 321) from an engine aero-thermal model (e.g., integrated engine aero-thermal model 320) including system data (e.g., system data 321). Optimization formulation module 510 may be configured to generate output 550 based on determination of one or more vane and bleed parameters for operation of a turboshaft engine. Based on received inputs, optimization formulation module 510 may determine an optimization problem for which optimization software will be able to solve as a numerically iterative process in real-time.

Constrained optimization solver 515 may receive optimization data (e.g., output 550) from the optimization formulation module 510 in order to generate the requested fuel flow, inlet guide vane schedules, and stability bleed schedules (WF, IGV & BLD request) 535. Constrained optimization solver 515 may be a numerical iteration tool which finds a solution to the optimization problem formulated by optimization formulation module 510. In addition, optimization formulation module 510 may be constrained to limits of the gas turbine engine, such as, without limitation, a rotor speed limit, a compressor stall limit, a lean blowout limit, a temperature limit, a pressure limit, or the like. According to one embodiment, constrained optimization solver module 515 is configured to receive output 550 including one of more vane and bleed parameters. Constrained optimization solver module 515 may optimize and/or modify received parameters to generate output for one or more of fuel flow (WF), inlet guide vane (IGV) schedules and stability bleed (BLD) goals, or requesting activation.

Figure 6:
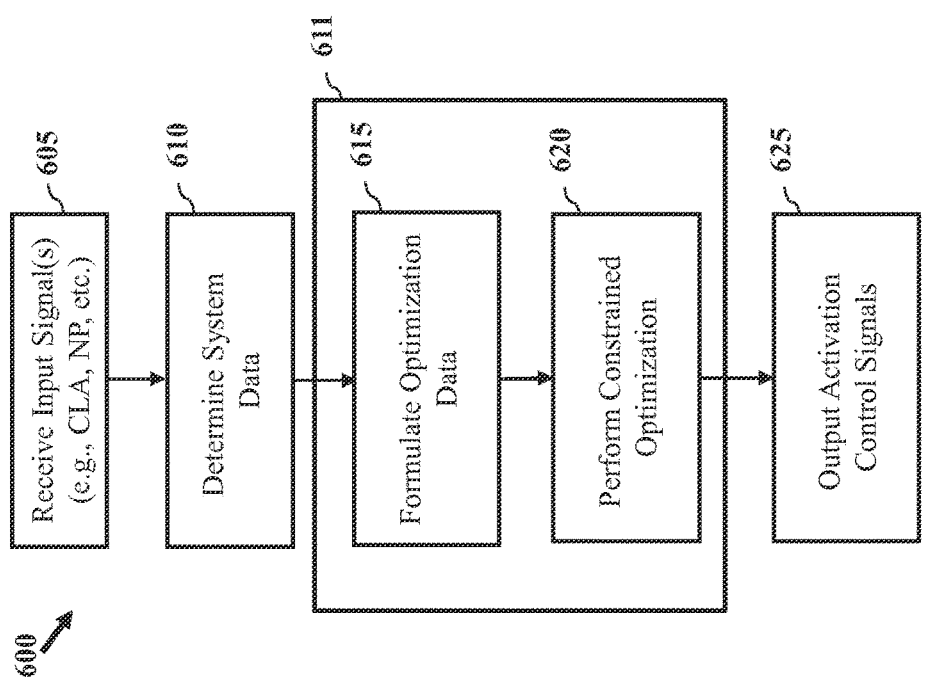
FIG. 6 depicts a process for controlling a turboshaft engine according to one or more embodiments.

Referring now to FIG. 6, a process is depicted for controlling a turboshaft engine according to one or more embodiments. According to one embodiment, process 600 may be employed to control a turboshaft engine by model-based control including multivariable feedback control of goals and limits using parameters for fuel flow (WF), inlet guide vane control (IGV), and bleed schedule output (BLD) and/or compressor variable geometry. According to another embodiment, process 600 may be performed by a control unit (e.g., control unit 105). In certain embodiments, process 600 may be performed by a control module including a model-based multi-variable control module and integrated engine aero-thermal model module (e.g., control module 310 includes model-based multi-variable control module 315 and integrated engine aero-thermal module 320).

In certain embodiments, process 600 may allow for the rotor load of a turboshaft engine load to run at a constant speed with a desired power. By controlling a gas generator section of a turboshaft engine, torque may be controlled to increase and/or change power. In certain embodiments, the power load speed may be held constant. In one embodiment, constant speed may be provided by changing torque.

Process 600 may be initiated at block 605 with receiving an input signal or signals, by the control unit, for a collective lever angle (CLA) command and a real-time power turbine speed (NP) of the engine. A control unit may receive a control signal indicating a desired speed for a turboshaft engine (e.g., control signal 125). The control signal received at block 605 may be generated based on one or more operator controls for a turboshaft engine. The control unit can receive at least one response model parameter and power turbine speed. The power turbine speed may be provided to the control unit by a feedback loop from the power turbine.

At block 610, system data (e.g., system data 321) is determined. In one embodiment, system data is determined based on an integrated engine aero-thermal model (e.g., integrated engine aero-thermal model module 320, integrated engine aero-thermal model module 400). System data can include one or more values for fuel flow (WF), inlet guide vane control (IGV), and bleed schedule output (BLD) by the control unit based on the input signals for the collective lever angle (CLA) command and the real-time power turbine speed (NP). In one embodiment, system data is determined at block 610 is determined by the control unit based at least in part on an integrated model for the turboshaft engine, the integrated model including a model of a gas generator section of the turboshaft engine and a model of a power turbine and rotor load section of the turboshaft engine. In certain embodiments, an integrated control module (e.g., integrated control module 320) includes one or more models stored in memory for state dependent operation of an engine (e.g., engine 110).

According to one embodiment, system data may be determined at block 610 based on a speed control signal and power turbine speed received at block 605. According to another embodiment, system data may be determined at block 610 based on a control unit using a integrated including a model of a gas generator section of the turboshaft engine and a power turbine model of the turboshaft engine, and response models determined for the turboshaft engine. The model for the gas generator section of the turboshaft engine may be a gas generator linear model parameterized as a function of one or more of corrected rotor speeds and flight condition. The model for the gas generator section of the turboshaft engine may be calculated in real time from an embedded nonlinear model for the gas generator of the turboshaft engine. The model for the power turbine and rotor load section of the turboshaft engine may be a power turbine and rotor load linear model independently parameterized from the gas generator section. Response model parameters may be generated based on one or more engine operating parameters. System data determined at block 610 can include control for one or more of fuel flow and variable compressor geometry.

In certain embodiments, system data is determined at block 610 based on a model for the power turbine section of the turboshaft engine calculated in real time from an embedded nonlinear power turbine and rotor load model, and is supplemented by a load disturbance estimator and supplemented by a gas generator model bias estimator. The plant model may be based on a 1-step or n-step model predictive control to provide multivariable feedback control using fuel flow and variable compressor geometry.

At block 611, control output is determined for fuel flow (WF), inlet guide vane control (IGV), bleed schedule output (BLD) by a control unit based on system data determined at block 610. Control output is determined by a control unit at block 610 based on formulating optimization data at block 615 and performing constrained optimization at block 620.

At block 615, optimization data is formulated. In one embodiment, optimization data is formulated by an optimization formulation module (optimization formulation module 510), wherein the optimization formulation module receives control input (e.g., control input 305, control input 505) indicating a preferred/target speed (NP_ref) (e.g., NP_ref 520), engine operational limits (e.g., engine operational limits 329, 525) and output from an engine aero-thermal model (e.g., integrated engine aero-thermal model 320, 400) including system data (e.g., system data 321). Thus, knowing the target speed of the reference model NP_ref, optimization formulation at block 615 generates output based on determination of one or more vane and bleed parameters for operation of a turboshaft engine. Formulating optimization data at block 615 may include determining an optimization problem for meeting a target the target speed. In certain embodiments, the optimization problem is determined at block 610 identifies a conflict between one or more of a preferred/target speed (NP_ref) (e.g., NP_ref 520), engine operational limits (e.g., engine operational limits 329, 525) and output from an engine aero-thermal model (e.g., output 530, system data 321).

At block 620, performing constrained optimization may include generating the requested fuel flow, inlet guide vane schedules, and stability bleed schedules (WF, IGV & BLD request) by a constrained optimization solver (e.g., constrained optimization solver 515). By way of example, constrained optimization at block 620 may include changing one or more of the fuel flow (WF), inlet guide vane control (IGV), bleed schedule output (BLD) parameters based on an optimization problem determined at block 610. Constrained optimization at block 620 may include one or more numerical iterations to determine an optimization problem formulated at block 615. In addition, optimization formulation at block 620 may be constrained to limits of the gas turbine engine, such as, without limitation, a rotor speed limit, a compressor stall limit, a lean blowout limit, a temperature limit, a pressure limit, or the like. Moreover, in some embodiments optimization may include using goal equations embedded into a performance index equation in order to determine which goals should be satisfied and which goals should be relaxed, such that none of the limit equations are violated. Entries in the matrix may be weighted to indicate priority where goals may be prioritized to generate the weighting matrices and to provide robustness. Constrained optimization at block 620 may optimize and/or modify received parameters to generate output for one or more of fuel flow (WF), inlet guide vane (IGV) schedules and stability bleed (BLD) goals, or requesting activation, to reconcile an optimization problem determined at block 610.

At block 625, activation control signals may be output, including outputting one or more control signals for control of the turboshaft engine by the control unit based on the control output for fuel flow (WF), inlet guide vane control (IGV), bleed schedule output (BLD).

Process 600 may be employed to the control output for one or more of helicopter propulsion, marine propulsion and electric power generation. Process 600 may allow for rotor speed management to provide desired helicopter performance and handling qualities, and the ability to tightly regulate rotor speed during aggressive collective pitch transients, as well as rotor load disturbances resulting from aggressive flight maneuvering such as high g turns or wave-off from a steep (auto-rotating) descent. As a result, system performance optimization can require simultaneous precise management of both the gas generator and rotor systems a turboshaft engine.

Process 600 may similarly be applied to other turboshaft applications such as electrical power generation, where rapid transient events such as drop load require precise management to keep the system on-line.

While this disclosure has been particularly shown and described with references to exemplary embodiments thereof, it will be understood by those skilled in the art that various changes in form and details may be made therein without departing from the scope of the claimed embodiments.

What is claimed is:

1. A method for controlling operation of a turboshaft engine, the method comprising the acts of:
    receiving, by a control unit of the turboshaft engine, input signals for a collective lever angle (CLA) command and real-time power turbine speed (NP) of the engine;
    determining system data for engine effectors by the control unit based on the input signals for the collective lever angle (CLA) command and the real-time power turbine speed (NP),
    wherein the engine effectors include at least two of fuel flow (WF), inlet guide vane control (IGV), and bleed schedule output (BLD),
    wherein the system data is determined by the control unit based at least in part on an integrated model for the turboshaft engine, the integrated model including a model of a gas generator section of the turboshaft engine and a model of a power turbine and rotor load section of the turboshaft engine;
    determining control output for the engine effectors by the control unit based on the system data,
    wherein the control output is determined by the control unit based at least in part on model-based multi-variable control including optimization formulation and a constrained optimization solver; and
    outputting one or more control signals for control of the turboshaft engine by the control unit based on the control output for the engine effectors.

2. The method of claim 1, wherein the collective lever angle (CLA) command includes pitch changes for rotor blades of a rotor load.

3. The method of claim 1, wherein the control output is determined based on one or more response model parameters determined by the integrated model.

4. The method of claim 1, wherein the model for the gas generator section of the turboshaft engine is a gas generator linear model parameterized as a function of one or more of corrected rotor speeds and flight condition.

5. The method of claim 1, wherein the model for the gas generator section of the turboshaft engine is calculated in real time from an embedded nonlinear model for the gas generator of the turboshaft engine.

6. The method of claim 1, wherein the model for the power turbine and rotor load section of the turboshaft engine is independently parameterized from the gas generator section.

7. The method of claim 1, wherein the model for the power turbine and rotor load section of the turboshaft engine is calculated in real time from an embedded nonlinear power turbine and rotor load model, and is supplemented by a load disturbance estimator.

8. The method of claim 1, wherein the optimization formulation determines an optimization problem for the system data based a preferred speed and engine operation limits for optimizing engine effectors that include one or more of fuel flow (WF), inlet guide vane control (IGV), and bleed schedule output (BLD).

9. The method of claim 8, wherein the constrained optimization solver performs a numerical iteration to determine a solution to the optimization problem.

10. The method of claim 1, wherein the control output is for one or more of helicopter propulsion, marine propulsion and electric power generation.

11. A turboshaft engine system comprising:
    a gas generator;
    a power turbine; and
    a computer processor control unit configured to control the gas generator and power turbine, wherein the computer processor control unit is configured to
        receive input signals for a collective lever angle (CLA) command and a real-time power turbine speed (NP) of the turboshaft engine;
        determine system data for engine effectors by the control unit based on the input signals for the collective lever angle (CLA) command and the real-time power turbine speed (NP),
        wherein the engine effectors include at least two of fuel flow (WF), inlet guide vane control (IGV), and bleed schedule output (BLD),
        wherein the system data is determined by the computer processor control unit based at least in part on an integrated model for the turboshaft engine, the integrated model including a model of a gas generator section of the turboshaft engine and a model of a power turbine and rotor load section of the turboshaft engine;
        determine control output for engine effectors by the computer processor control unit based on the system data,
        wherein the control output is determined by the computer processor control unit based at least in part on model-based multi-variable control including optimization formulation and a constrained optimization solver; and
        output one or more control signals for control of the turboshaft engine by the computer processor control unit based on the control output for engine effectors.

12. The turboshaft engine of claim 11, wherein the collective lever angle (CLA) command includes pitch changes for rotor blades of a rotor load.

13. The turboshaft engine of claim 11, wherein the control output is determined based on one or more response model parameters determined by the integrated model.

14. The turboshaft engine of claim 11, wherein the model for the gas generator section of the turboshaft engine is a gas generator linear model parameterized as a function of one or more of corrected rotor speeds and flight condition.

15. The turboshaft engine of claim 11, wherein the model for the gas generator section of the turboshaft engine is calculated in real time from an embedded nonlinear model for the gas generator of the turboshaft engine.

16. The turboshaft engine of claim 11, wherein the model for the power turbine and rotor load section of the turboshaft engine is independently parameterized from the gas generator section.

17. The turboshaft engine of claim 11, wherein the model for the power turbine and rotor load section of the turboshaft engine is calculated in real time from an embedded nonlinear power turbine and rotor load model, and is supplemented by a load disturbance estimator and supplemented by a gas generator model bias estimator.

18. The turboshaft engine of claim 11, wherein the optimization formulation determines an optimization problem for the system data based on a preferred speed and engine operation limits for optimizing engine effectors for one or more of fuel flow (WF), inlet guide vane control (IGV), and bleed schedule output (BLD).

19. The turboshaft engine of claim 18, wherein the constrained optimization solver performs a numerical iteration to determine a solution to the optimization problem.

20. The turboshaft engine of claim 19, wherein the control output is for one or more of helicopter propulsion, marine propulsion and electric power generation.

* * * * *